US012220085B2

(12) United States Patent
Reyes et al.

(10) Patent No.: US 12,220,085 B2
(45) Date of Patent: Feb. 11, 2025

(54) GRINDER

(71) Applicant: G&E Innovations, Inc., Las Vegas, NV (US)

(72) Inventors: Gustavo Reyes, Las Vegas, NV (US); Esther Delgado-Lago, Las Vegas, NV (US)

(73) Assignee: G&EInnovations, Inc., Las Vegas, NV (US)

( * ) Notice: Subject to any disclaimer, the term of this patent is extended or adjusted under 35 U.S.C. 154(b) by 0 days.

(21) Appl. No.: 18/366,624

(22) Filed: Aug. 7, 2023

(65) Prior Publication Data

US 2023/0371750 A1 Nov. 23, 2023

Related U.S. Application Data

(63) Continuation of application No. 16/964,951, filed as application No. PCT/US2019/014964 on Jan. 24, 2019, now Pat. No. 11,744,404.

(60) Provisional application No. 62/760,562, filed on Nov. 13, 2018, provisional application No. 62/742,858, filed on Oct. 8, 2018, provisional application No. 62/622,745, filed on Jan. 26, 2018.

(51) Int. Cl.
*A47J 42/36* (2006.01)
*A47J 42/46* (2006.01)
*B02C 13/16* (2006.01)
*B02C 13/28* (2006.01)

(52) U.S. Cl.
CPC ............... *A47J 42/36* (2013.01); *A47J 42/46* (2013.01); *B02C 13/16* (2013.01); *B02C 13/28* (2013.01); *B02C 2013/2816* (2013.01)

(58) Field of Classification Search
CPC .. B02C 13/16; B02C 2013/2816; A47J 42/36; A47J 42/46
USPC ......................................................... 241/193
See application file for complete search history.

(56) References Cited

U.S. PATENT DOCUMENTS

| | | |
|---|---|---|
| 795,746 A | 7/1905 | Wingfield et al. |
| 1,351,711 A | 8/1920 | White |
| 1,728,976 A | 9/1929 | Nobis |
| 3,128,083 A | 4/1964 | Blair |
| 3,993,256 A | 11/1976 | Brewer |
| 4,214,488 A | 7/1980 | Conrad |
| 4,594,745 A | 6/1986 | Pierce |
| 4,862,969 A | 9/1989 | Jobst et al. |
| 5,163,627 A | 11/1992 | Bouche |
| 5,613,425 A | 3/1997 | Krznaric |
| 5,697,563 A | 12/1997 | Fujimoto |
| 5,839,671 A | 11/1998 | Sand |
| 6,039,277 A | 3/2000 | Hamm |

(Continued)

FOREIGN PATENT DOCUMENTS

| | | |
|---|---|---|
| CN | 108525993 | 9/2018 |
| DE | 102007040225 A1 | 2/2009 |

(Continued)

*Primary Examiner* — Faye Francis
(74) *Attorney, Agent, or Firm* — Aura IP Law, PC

(57) ABSTRACT

A grinder includes a body having a first end, a second end defining an opening, and an interior surface defining an inner chamber extending from the opening at least partially towards the first end. The grinder also includes a chain positioned within the inner chamber. The chain includes a plurality of balls. The grinder further includes a motor coupled to the chain. The motor is configured to cause rotational or reciprocal motion of the chain within the inner chamber.

13 Claims, 13 Drawing Sheets

(56) References Cited

U.S. PATENT DOCUMENTS

| | | | |
|---|---|---|---|
| D474,378 S | 5/2003 | Brandenburg | |
| 6,945,486 B2 | 9/2005 | Teng | |
| 8,220,732 B2 | 7/2012 | Griffin et al. | |
| 8,393,563 B2 | 3/2013 | Chaoui et al. | |
| 9,327,286 B2 | 5/2016 | Trebucchi | |
| D762,091 S | 7/2016 | Grumbacher et al. | |
| 9,480,989 B1 | 11/2016 | Chang | |
| D804,093 S | 11/2017 | Chen | |
| D814,251 S | 4/2018 | Müller et al. | |
| D833,673 S | 11/2018 | Booth | |
| D853,803 S | 7/2019 | Zhang | |
| D862,537 S | 10/2019 | Larose | |
| 2007/0104024 A1 | 5/2007 | Elrod | |
| 2009/0032627 A1 | 2/2009 | Krasznai | |
| 2013/0214068 A1 | 8/2013 | Camitta | |
| 2013/0305969 A1 | 11/2013 | Trebucchi et al. | |
| 2016/0144371 A1 | 5/2016 | Sontag | |
| 2020/0129986 A1 | 4/2020 | Gronholz | |

FOREIGN PATENT DOCUMENTS

| | | |
|---|---|---|
| DE | 202008016663 U1 | 4/2009 |
| DE | 202011108424 U1 | 3/2012 |
| EP | 1023940 A2 | 8/2000 |
| EP | 1447137 A1 | 8/2004 |
| FR | 2951660 A1 | 4/2011 |

় # GRINDER

CROSS-REFERENCE TO RELATED APPLICATIONS

The present application is a continuation application under 35 U.S.C. § 121 of U.S. application Ser. No. 16/964,951, entitled "GRINDER," filed Jul. 24, 2020, which is as a U.S. National Stage entry under 35 U.S.C. § 371 of International Application No. PCT/US2019/014964, filed on Jan. 24, 2019, designating the United States of America and published in English on Aug. 1, 2019, which claims priority to U.S. Provisional Application Ser. Nos. 62/760,562, 62/742,858, and 62/622,745, each of which is hereby incorporated by reference in its entirety.

BACKGROUND

Field

The present application relates generally to appliances, and more specifically to devices, systems, and methods for grinding a material.

Description of the Related Art

Herbs, spices, or other plant materials can be ground or shredded prior to use. For example, raw *cannabis* is often broken down prior to use, either by hand or using a grinder. When broken down by hand, the resulting *cannabis* product is often lumpy, which can cause uneven distribution of *cannabis* in a joint or bowl. Due to the sticky nature of raw *cannabis*, breaking down *cannabis* by hand typically causes substantial amounts of *cannabis* to stick to the fingers. *Cannabis* grinders are often used to create a more evenly distributed product that burns more consistently. Both manual and electric grinders are used to grind raw *cannabis*.

Manual grinders often utilize rotatable grinding surfaces having teeth. The teeth are aligned to grind or shred a material placed between the teeth upon rotation of the grinding surfaces.

Many electric grinders grind or cut materials using one or more rotating blades. Similar to a blender, traditional electric grinders can include a housing that can be loaded with a material and sealed using a lid. Blades at the bottom of the housing can be rotated using an electric motor.

SUMMARY

Described herein are embodiments of devices, systems, and methods for grinding a material.

In certain embodiments, a grinder is provided. The grinding includes a body having a first end, a second end defining an opening, and an interior surface defining an inner chamber extending from the opening at least partially towards the first end. The grinder also includes a chain positioned within the inner chamber. The chain includes a plurality of balls. The grinder also includes a motor coupled to the chain. The motor is configured to cause rotational or reciprocal motion of the chain within the inner chamber.

In certain embodiments, the grinder includes an axle, wherein the chain is coupled to the motor via the axle. In certain embodiments, a middle section of the chain is secured to the axle. In certain embodiments, an end of the chain is secured to the axle. In certain embodiments, the axle includes a slot, wherein one of the plurality of balls is secured within the slot of the axle.

In certain embodiments, the grinder includes an actuator configured to activate the motor. In certain embodiments, the grinder includes a cap moveably coupled to the first end of the body. In certain embodiments, the cap is moveable first end of the body. In certain embodiments, the actuator is positioned such that depression of the cap towards the first end of the body actuates the actuator.

In certain embodiments, the grinder includes a power source configured to provide electrical power to the motor. In certain embodiments, the power source is rechargeable, wherein the grinder further includes a port configured to receive a power cable.

In certain embodiments, the chain is formed of one or more metals.

In certain embodiments, chain includes a plurality of links connecting the plurality of balls. In certain embodiments, the plurality of links form spaces between adjacent balls of the plurality of balls. In certain embodiments, the links are substantially rigid. In certain embodiments, the links are substantially flexible.

In certain embodiments, the balls are substantially solid. In certain embodiments, the balls are substantially hollow.

In certain embodiments, the balls are positioned to cut materials within the chamber at multiple points and multiple sizes while the motor is activated.

In certain embodiments, the chain is configured to wrap around materials within the inner chamber while the motor is activated.

In certain embodiments, the chain includes between five balls and ten balls.

In certain embodiments, the balls have a diameter between 0.5 mm to 5 mm.

In certain embodiments, the chain has a length between 25 mm to 125 mm.

In certain embodiments, adjacent balls of the plurality of balls are separated by a distance between 0.5 mm to 5 mm.

In certain embodiments, the grinder includes an orientation sensor configured to detect an orientation of the grinder. In certain embodiments, the grinder is configured to deactivate the motor if the orientation detector determines that a bottom edge of the grinder is misaligned.

In certain embodiments, a method for grinding a material is provided. The method includes positioning a grinder above the material. The grinder includes a chain positioned within an inner chamber of the grinder and a motor coupled to the chain. The chain includes a plurality of balls. The method also includes activating the motor to cause rotational or reciprocal motion of the chain within the inner chamber and lowering the grinder over the material so that the chain contacts the material.

In certain embodiments, activating the motor to cause rotation or reciprocal motion of the chain is performed prior to lowering the chain over the material.

In certain embodiments, activating the motor to cause rotation or reciprocal motion of the chain is performed after lowering the chain over the material.

In certain embodiments, the grinder includes a body and a movable cap coupled to the body, wherein activating the motor includes depressing the cap towards the body.

In certain embodiments, the grinder includes an axle, wherein the chain is coupled to the motor via the axle. In certain embodiments, a middle section of the chain is secured to the axle. In certain embodiments, wherein an end of the chain is secured to the axle. In certain embodiments, the axle includes a slot, wherein one of the plurality of balls is secured within the slot of the axle.

In certain embodiments, the grinder includes a power source configured to provide electrical power to the motor. In certain embodiments, the power source is rechargeable, wherein the grinder further includes a port configured to receive a power cable.

In certain embodiments, the chain is formed of one or more metals.

In certain embodiments, the chain includes a plurality of links connecting the plurality of balls. In certain embodiments, the plurality of links form spaces between adjacent balls of the plurality of balls. In certain embodiments, the links are substantially rigid. In certain embodiments, the links are substantially flexible.

In certain embodiments, the balls are substantially solid. In certain embodiments, the balls are substantially hollow.

In certain embodiments, lowering the grinder over the material so that the chain contacts the material includes lowering the grinder over the material such that the balls cut the material within the chamber at multiple points and multiple sizes while the motor is activated.

In certain embodiments, lowering the grinder over the material so that the chain contacts the material includes lowering the grinder over the material such that the chain wraps around materials within the inner chamber while the motor is activated.

In certain embodiments, the chain includes between five balls and ten balls.

In certain embodiments, the balls have a diameter between 0.5 mm to 5 mm.

In certain embodiments, the chain has a length between 25 mm to 125 mm.

In certain embodiments, adjacent balls of the plurality of balls are separated by a distance between 0.5 mm to 5 mm.

In certain embodiments, the method includes detecting the orientation of the grinder by an orientation sensor. In certain embodiments, the method includes deactivating the motor if the orientation detector determines that a bottom edge of the grinder is misaligned.

In certain embodiments, a grinder having one or more of the features of the following description is provided.

In certain embodiments, a method having one or more of the features of the following description is provided.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description" one will understand how illustrated features serve to explain certain principles of the present disclosure.

DETAILED DESCRIPTION

Figure 1:
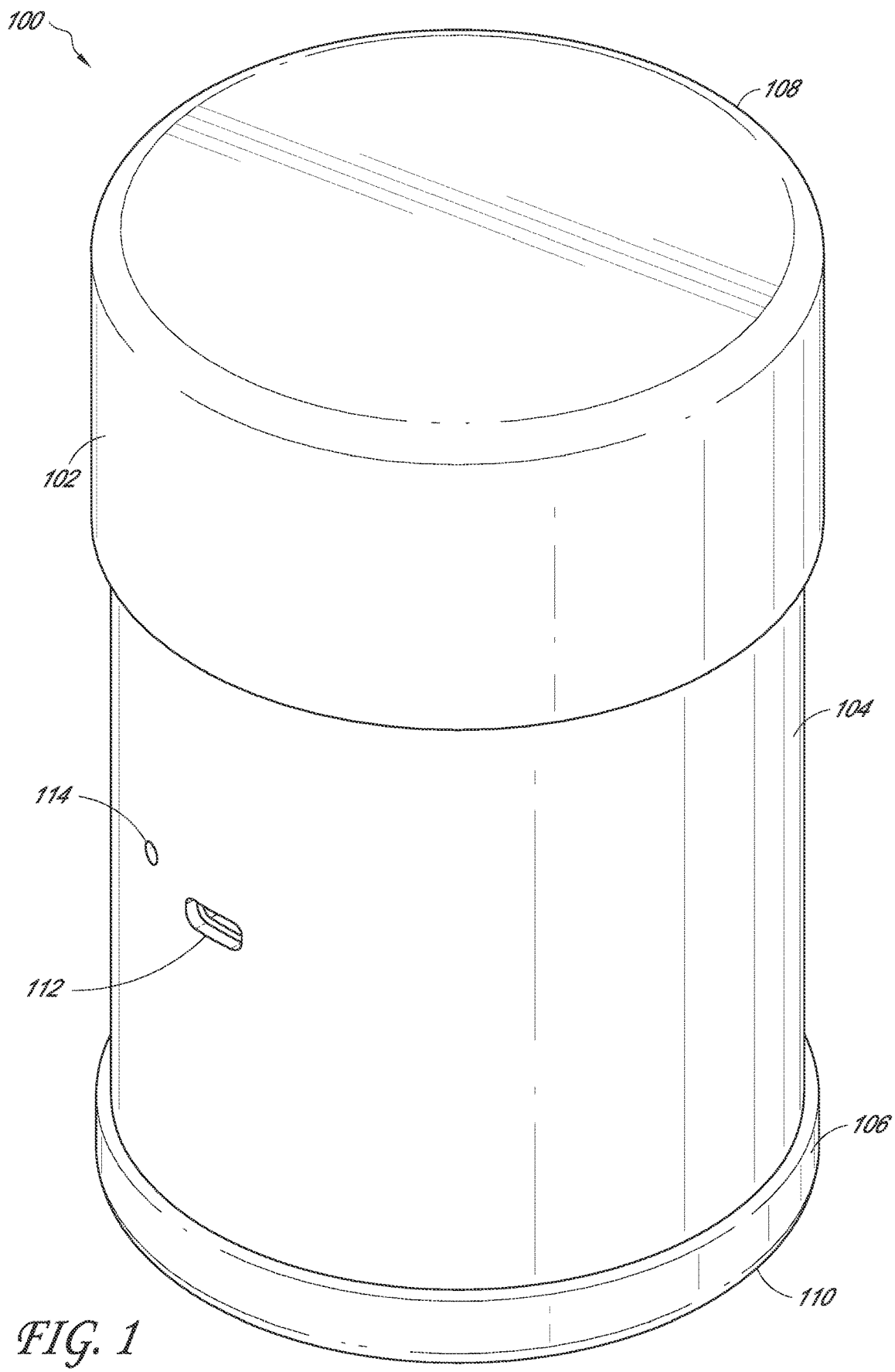
FIG. 1 is a perspective view of an embodiment of a grinder.

The following detailed description is directed to certain specific embodiments. The invention(s) disclosed herein, however, can be embodied in a multitude of different ways as defined and covered by the claims. In this description, reference is made to the drawings, wherein like parts are designated with like numerals throughout. The features, aspects and advantages of the present invention will now be described with reference to the drawings of several embodiments that are intended to be within the scope of the development herein disclosed. These and other embodiments will become readily apparent to those skilled in the art from the following detailed description of the embodiments having reference to the attached figures, the invention not being limited to any particular embodiment(s) herein disclosed.

According to some preferred embodiments, the methods, systems, and apparatuses described herein relate to a grinding device or grinder. The grinder can be used for grinding, cutting, chopping, pulverizing, or otherwise breaking apart materials.

In certain embodiments, a grinding device or grinder is provided. In certain embodiments, the grinder can include a body configured to receive a material.

In certain embodiments, the body can include an opening at an inferior end of the body that can be placed over a material to be ground, cut, chopped, pulverized, or otherwise broken apart.

In certain embodiments, the body can be coupled to a cap that can be moved relative to the body to actuate the grinder. In certain embodiments, the cap can be coupled to a superior end of the body. In certain embodiments, the cap can be depressed inferiorly towards the body to actuate the grinder. In certain embodiments, the cap can be released from its depressed position to deactivate the grinder. In certain embodiments, the grinder can be deactivated by depressing the cap while the grinder is activated.

In certain embodiments, the body can include a motor. In certain embodiments, the motor can be actuated by the depression of the cap towards the body. In certain embodiments, the motor can be deactivated by release of the cap from its depressed position. In certain embodiments, the motor can be deactivated be depressing the cap while the motor is active.

In certain embodiments, the grinder can include a power source such as a battery. In certain embodiments, the power source can provide power to the motor.

In certain embodiments, depression of the cap towards the body can initiate an electrical connection between the motor and the power source. In certain embodiments, the depression of the cap towards the body can activate a switch. In certain embodiments, release of the cap from its depressed position can deactivate the switch.

In certain embodiments, the grinder can include a port configured to receive a power cable. In certain embodiments, the power source can be charged through the port.

In certain embodiments, the inner walls of the body of the grinder can define an inner chamber at the inferior end of the grinder. In certain embodiments, the grinder can include a chain. The chain can be rotated to grind, cut, chop, pulverize, or otherwise break apart materials positioned within the inner chamber. In certain embodiments, the chain can be rotated to grind, cut, chop, pulverize, or otherwise break apart materials that enter the inner chamber as the opening of the body is advanced over the materials.

In certain embodiments, the chain can be a ball chain. In certain embodiments, the chain can include a plurality of balls. In certain embodiments, the chain can include one ball, two balls, three balls, four balls, five balls, six balls, seven balls, eight balls, nine balls, ten balls, eleven balls, twelve balls, thirteen balls, fourteen balls, fifteen balls, sixteen balls, seventeen balls, eighteen balls, nineteen balls, twenty balls, or any other suitable number of balls. In certain embodiments, the chain can include between two balls and twenty balls, between five balls and fifteen balls, between eight balls and twelve balls, between two balls and five balls, between five balls and ten balls, between ten balls and fifteen balls, between fifteen balls and twenty balls, or any other suitable range.

In certain embodiments, the balls can be round or generally round, spherical or generally spherical, oblong, cubic or generally cubic, rectangular or generally rectangular, polygonal, faceted, or any other suitable shape. In certain embodiments, the balls can be hollow or substantially hollow. In certain embodiments, the balls can be solid or substantially solid. In certain embodiments, a hollow ball can connect two chains, and one or more of those chains can be connected to another hollow ball. In certain embodiments, an open ball can be squeezed closed over a wire or string to form one of the balls of the chain.

In certain embodiments, the balls can have a diameter between 0.5 mm and 10 mm, between 0.5 mm and 5 mm, between 5 mm and 10 mm, between 1 mm and 9 mm, between 2 mm and 8 mm, between 3 mm and 7 mm, between 4 mm and 6 mm, between 1 mm and 5 mm, between 1 mm and 4 mm, between 1 mm and 3 mm, between 1 mm and 2 mm, between 2 mm and 5 mm, between 2 mm and 3 mm, between 3 mm and 5 mm, between 3 mm and 4 mm, or any other suitable diameter.

In certain embodiments, the balls can be formed of metal, plastic, or any other suitable materials. In certain embodiments, the balls can be formed of steel. In certain embodiments, the balls can be formed of aluminum.

In certain embodiments, adjacent balls can be connected to one another by a link. In certain embodiments, adjacent balls can be separated from one another by the link.

In certain embodiments, the chain can be a metal ball chain. In certain embodiments, the chain can be a steel ball chain. In certain embodiments, the chain can be an aluminum ball chain. In certain embodiments, the chain can be a polymer ball chain. In certain embodiments, the chain can be a plastic ball chain. In certain embodiments, the chain can be a nylon ball chain.

In certain embodiments, the length of the chain can be between 25 mm and 125 mm, between 50 mm and 100 mm, between 60 mm and 90 mm, between 70 mm and 80 mm, between 60 mm and 70 mm, between 80 mm and 90 mm, between 10 mm and 60 mm, between 20 mm and 50 mm, between 30 mm and 40 mm, or any other suitable length. In certain embodiments, the length of the chain can be 10 mm, about 10 mm, 20 mm, about 20 mm, 30 mm, about 30 mm, 40 mm, about 40 mm, 50 mm, about 50 mm, 60 mm, about 60 mm, 70 mm, about 70 mm, 80 mm, about 80 mm, 90 mm, about 90 mm, 100 mm, about 100 mm, 110 mm, about 110 mm, 120 mm, about 120 mm, or any other suitable length.

In certain embodiments, the ball chain can be coupled to the motor via an axle or drive shaft. In certain embodiments, the ball chain can be coupled to the motor via one or more gears. In certain embodiments, a ball on a first end of the ball chain can be connected to the axle. In certain embodiments, a ball in a center section of ball chain can be connected to the axle. In certain embodiments, the motor can be activated to cause the chain to undergo circular or rotational motion. In certain embodiments, the motor can be activated to cause the chain to undergo reciprocal motion.

In certain embodiments, the links of the chain can form spaces between each ball within which the ball can move back and forth on the link to facilitate cutting actions at multiple points and multiple sizes. In certain embodiments, when activated, the chain can cause a whiplash effect or a curling effect as the chain wraps around materials that enter the inner chamber as the opening of the body is advanced over the materials.

In certain embodiments, the space between balls can be minimized (e.g., no spacing, enough spacing to permit the chain to flex, or larger spacing). For example, in certain embodiments, the space between adjacent balls can be between 0 mm and 20 mm, between 0.5 mm and 10 mm, between 0.5 mm and 5 mm, between 5 mm and 10 mm, between 1 mm and 9 mm, between 2 mm and 8 mm, between 3 mm and 7 mm, between 4 mm and 6 mm, between 1 mm and 5 mm, between 1 mm and 4 mm, between 1 mm and 3 mm, between 1 mm and 2 mm, between 2 mm and 5 mm, between 2 mm and 3 mm, between 3 mm and 5 mm, between 3 mm and 4 mm, or any other suitable distance. In certain embodiments, the link between the balls can be rigid (e.g., a rod or wire). In certain embodiments, the link between the balls can be flexible (e.g., a string of polymeric material).

In certain embodiments, a plurality of springs can be placed between the body and the cap of the grinder. In certain embodiments, the springs can be compressed upon depression of the cap towards the body. In certain embodiments, if a force depressing the cap is removed from the cap, the springs can expand to cause the cap to return to a resting position.

In certain embodiments, the grinder can include one or more sensors. In certain embodiments, the grinder can include one or more sensors configured to detect an orientation of the grinder. In certain embodiments, the grinding device can be configured to deactivate the motor if a bottom edge of the grinding device is not positioned at a predefined orientation.

In certain embodiments, the grinder can communicate with one or more external devices via wireless or Bluetooth connectivity.

In certain embodiments, the grinder can include a lid that can be removably coupled to the inferior end of the grinder body.

FIG. 1 illustrates a top perspective view of an embodiment of a grinder 100. As shown in FIG. 1, in certain embodiments, the grinder 100 can include a body 104.

In certain embodiments, the grinder 100 can include a cap 102. In certain embodiments, the cap 102 can be coupled to the body 104. For example, as shown in FIG. 1, in certain embodiments, the cap 102 can be coupled to a superior end of the body 104. In certain embodiments, a top surface of the cap 102 can define a superior end 108 of the grinder 100.

In certain embodiments, the grinder 100 can include a rim 106. In certain embodiments, the rim 106 can be coupled to or integrally formed with the body 104. For example, as shown in FIG. 1, in certain embodiments, the rim 106 can be coupled to an inferior end of the body 104. In certain embodiments, the rim 106 can be part of the body 104. In certain embodiments, a bottom surface of the rim 106 can define an inferior end 110 of the grinder 100.

Figure 2:
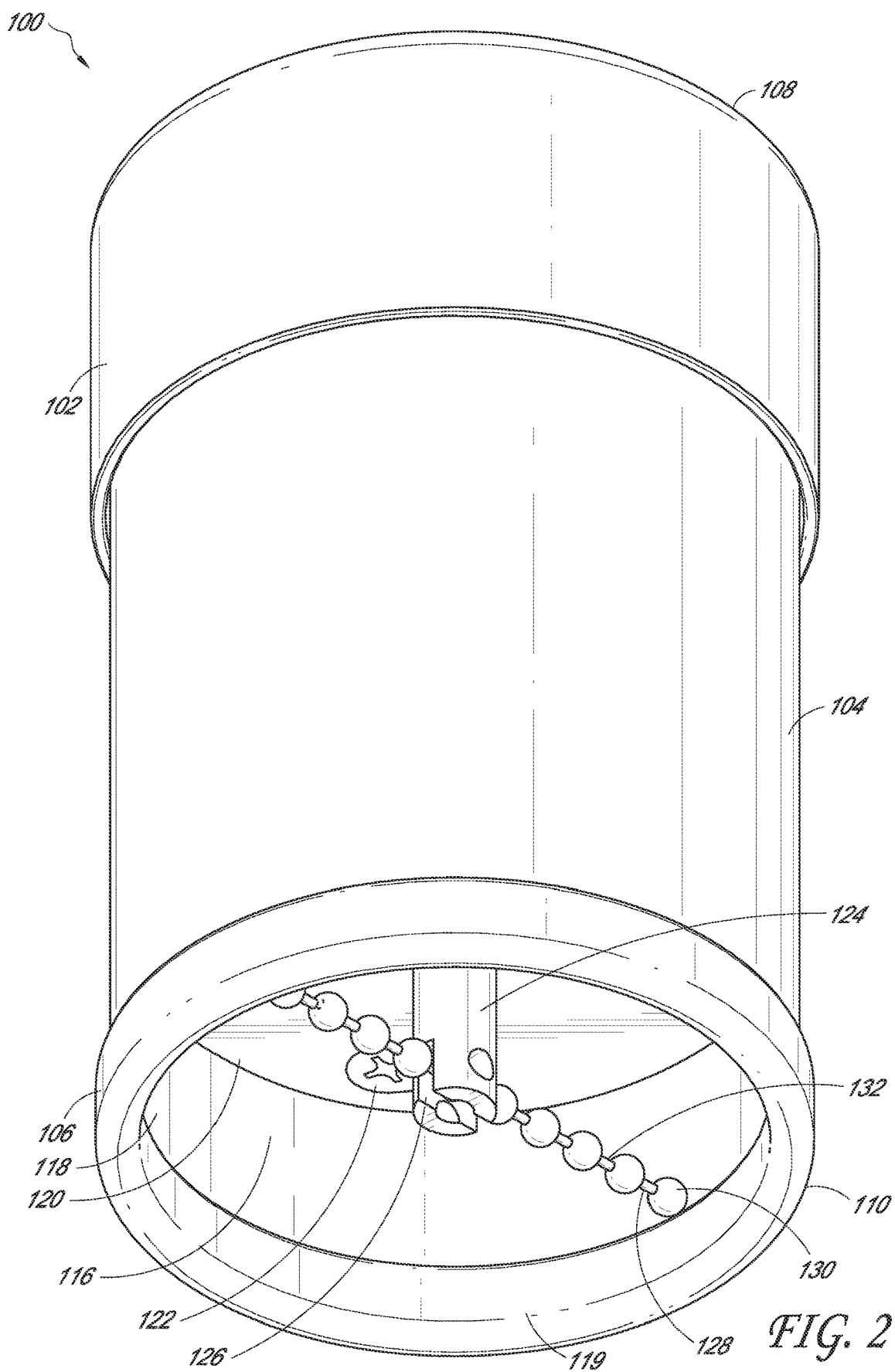
FIG. 2 is a perspective view of the grinder of FIG. 1.
Figure 3:
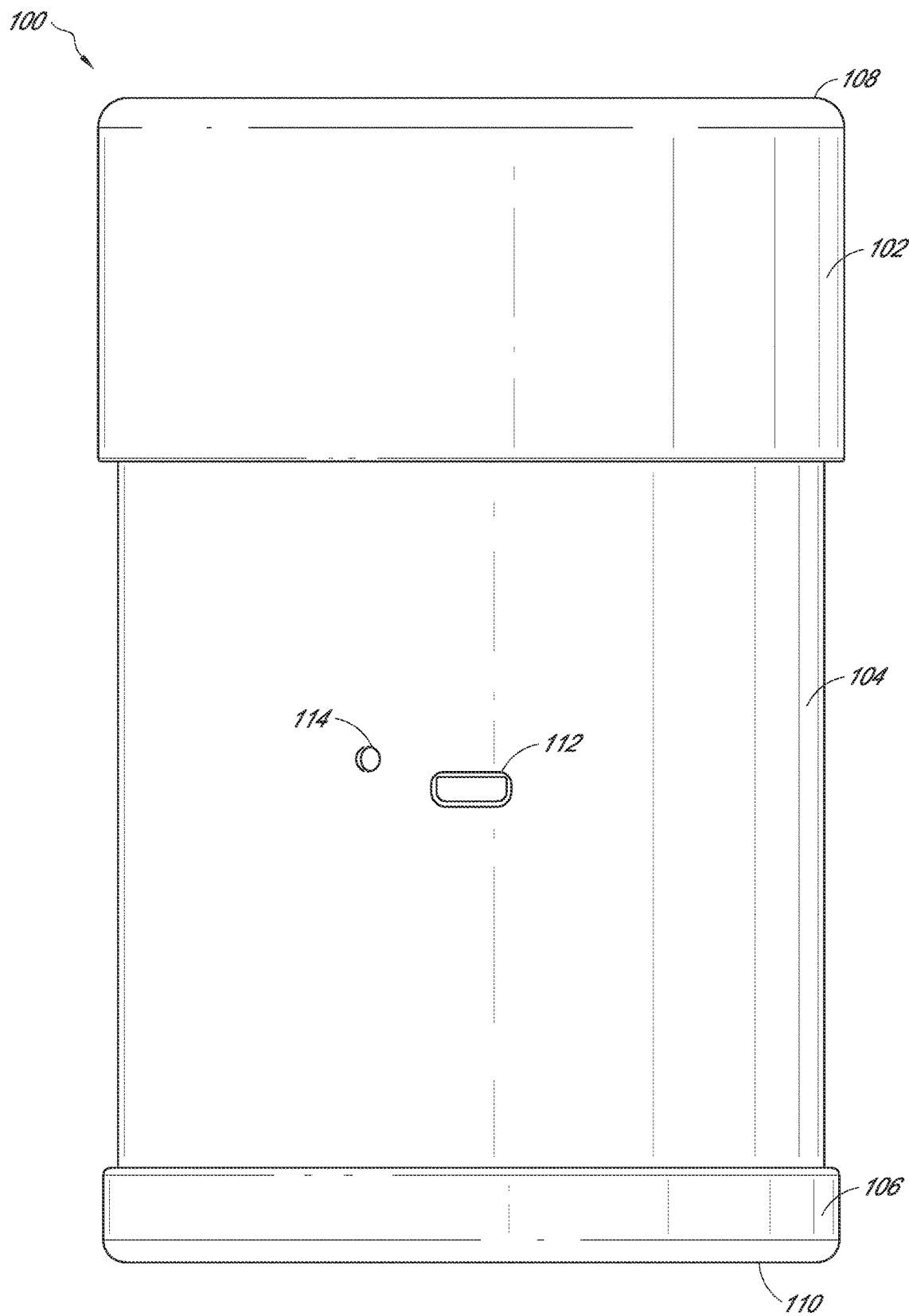
FIG. 3 is a front view of the grinder of FIG. 1.
Figure 4:
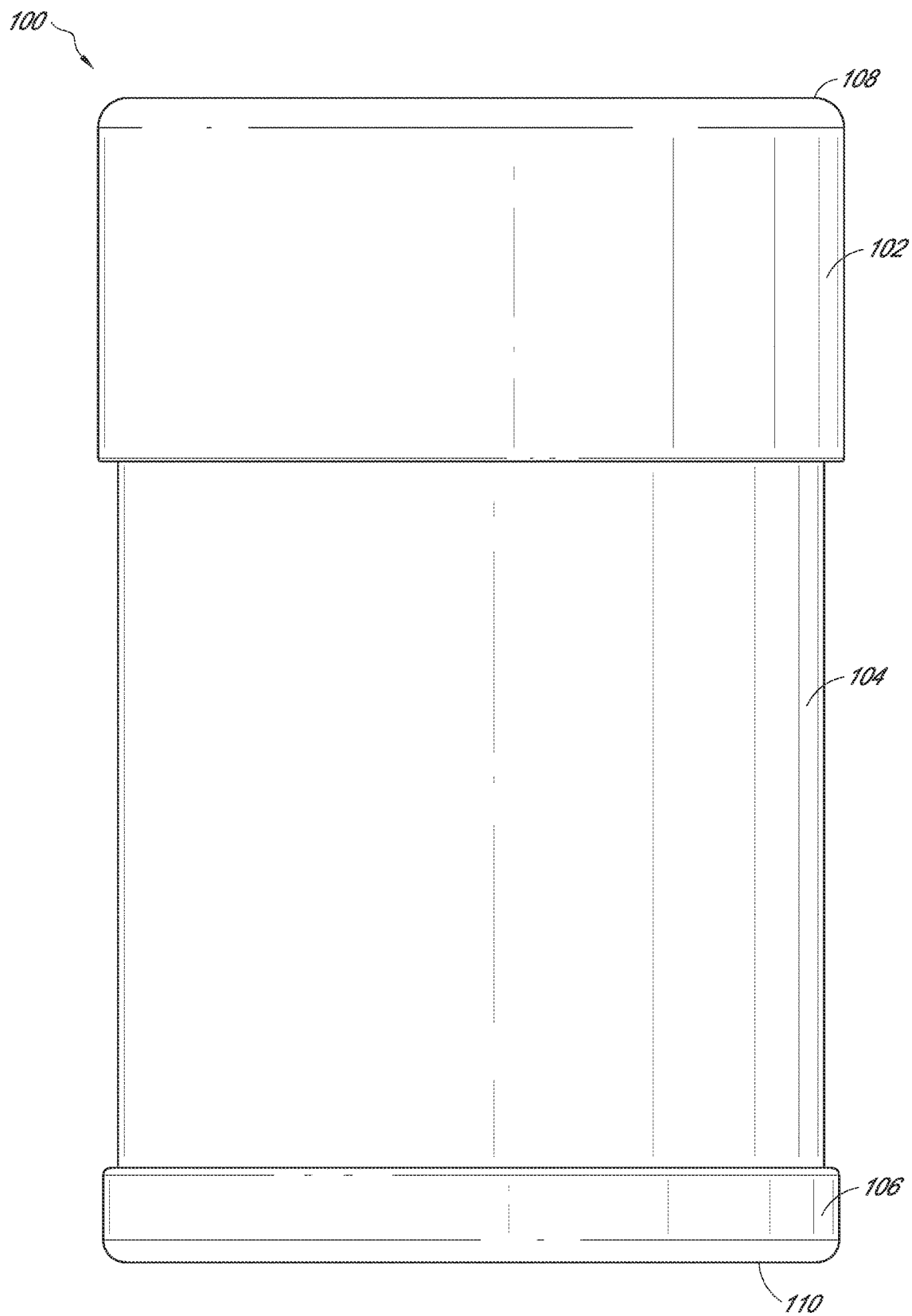
FIG. 4 is a rear view of the grinder of FIG. 1.
Figure 5:
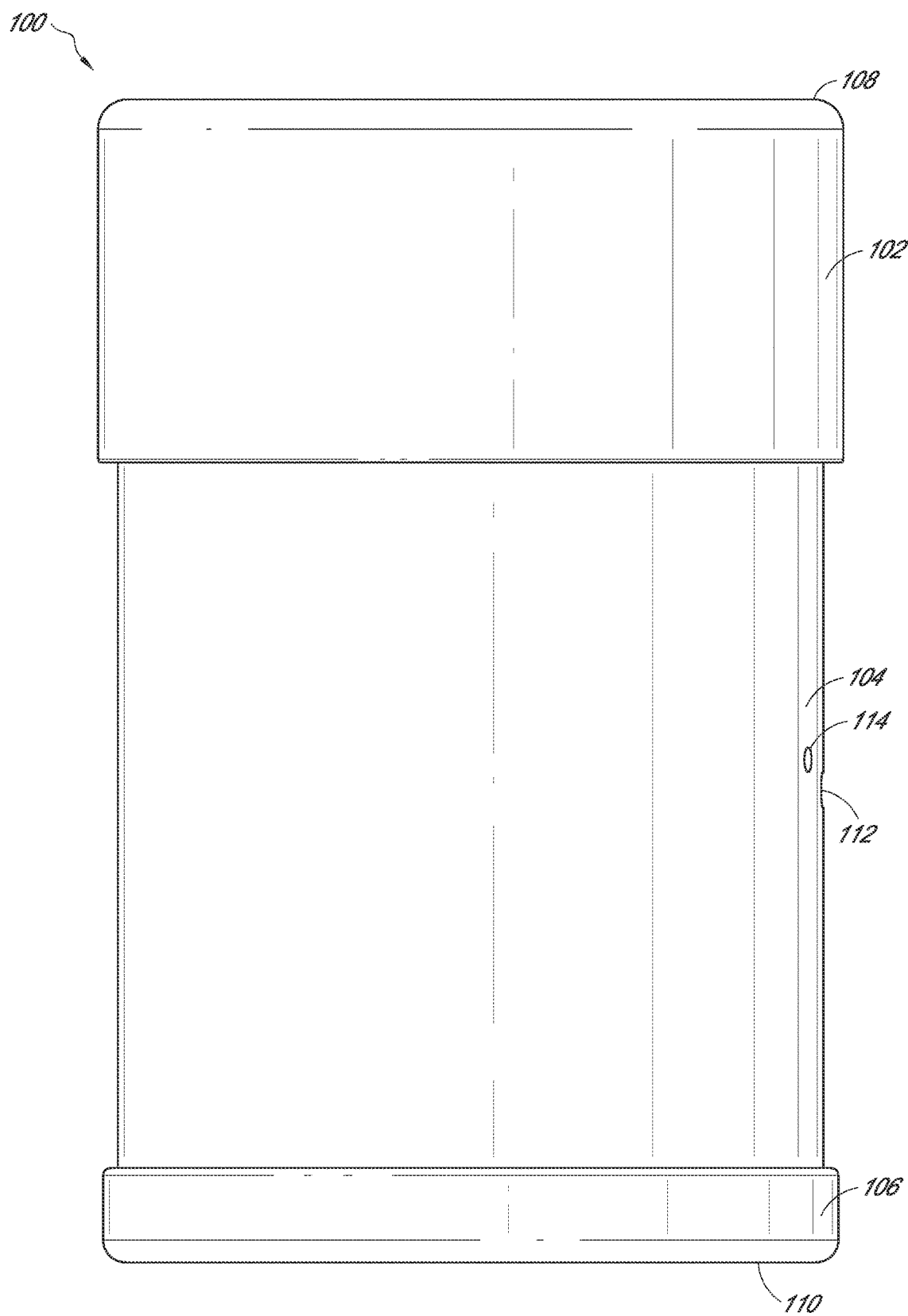
FIG. 5 is a first side view of the grinder of FIG. 1.
Figure 6:
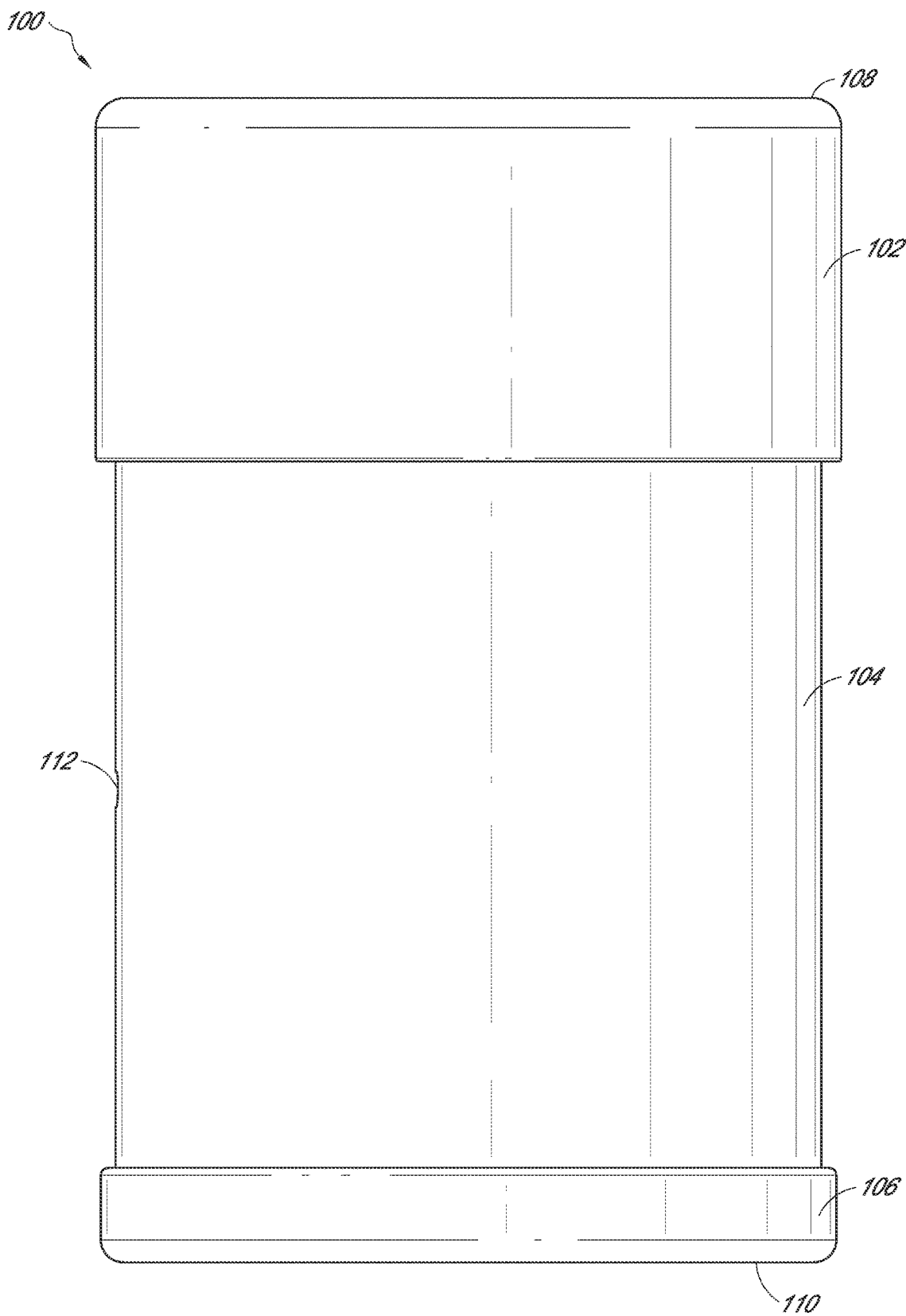
FIG. 6 is a second side view of the grinder of FIG. 1.
Figure 7:
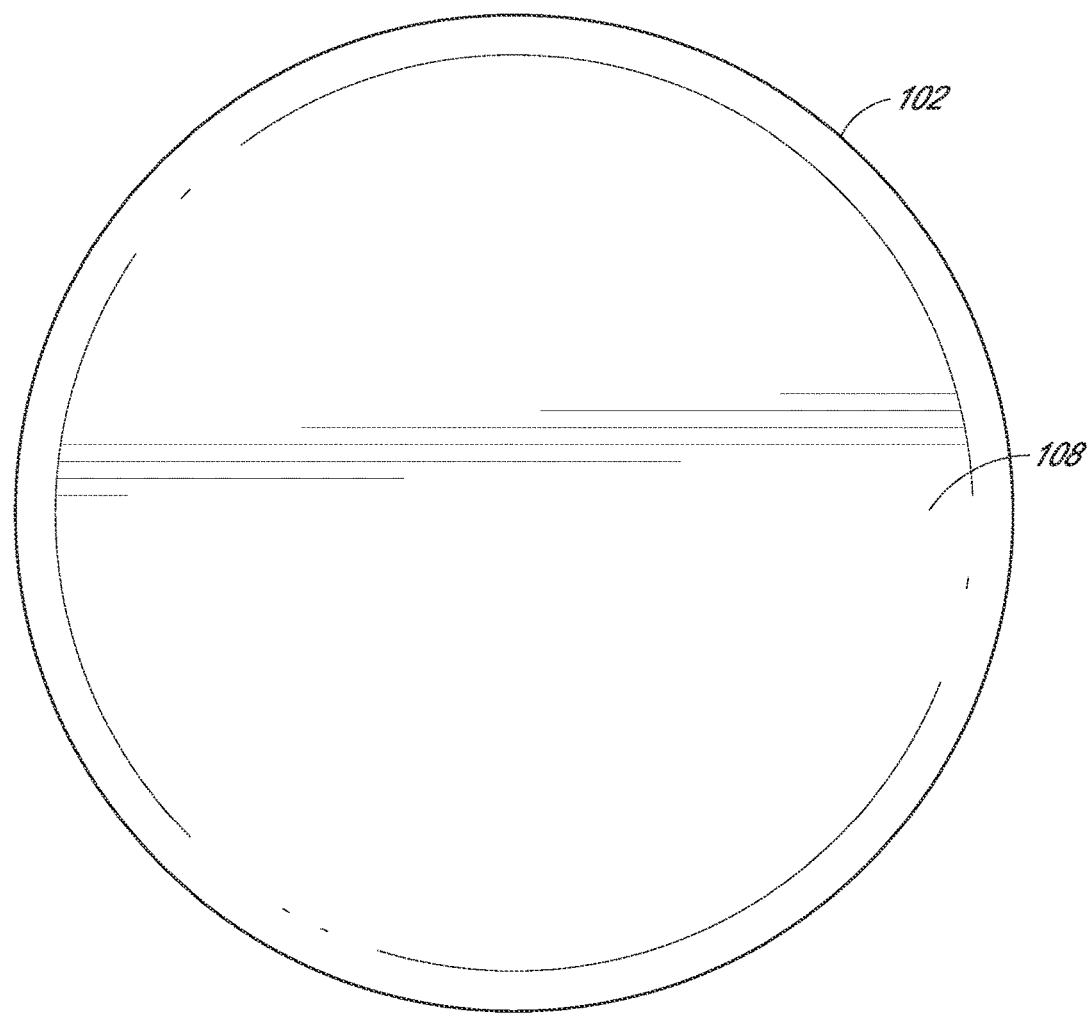
FIG. 7 is a top view of the grinder of FIG. 1.
Figure 8:
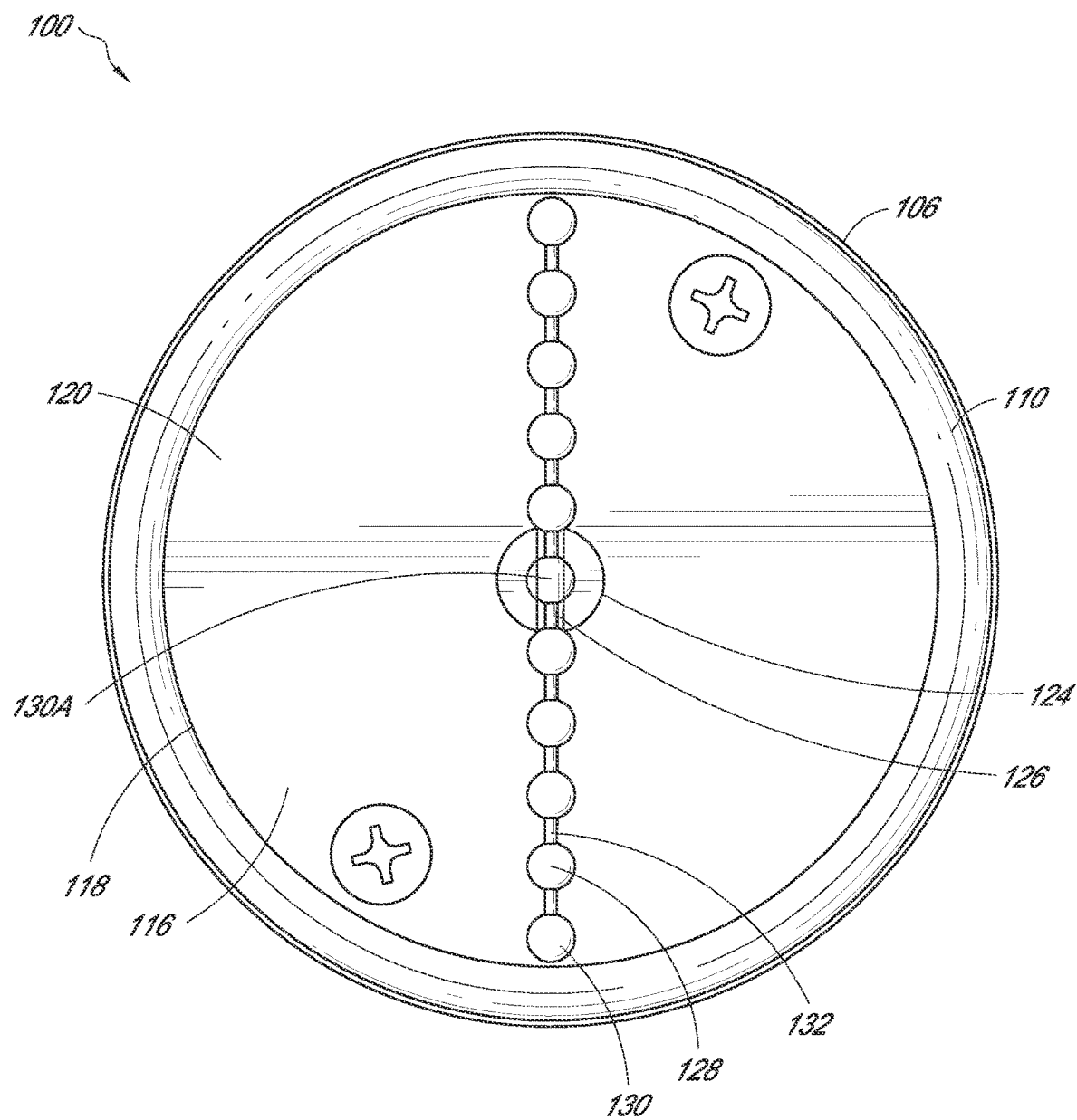
FIG. 8 is a bottom view of the grinder of FIG. 1.
Figure 9:
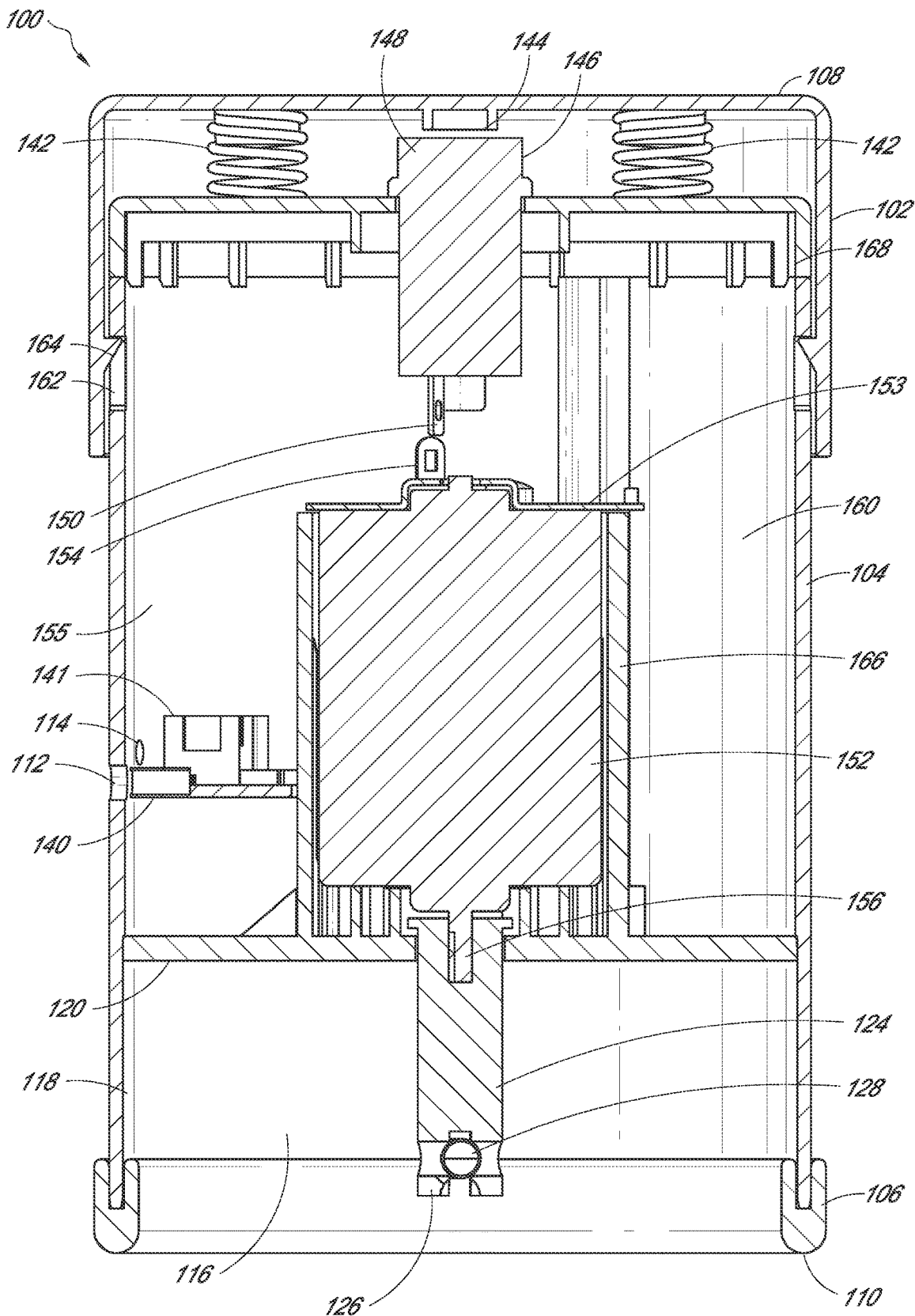
FIG. 9 is a cross-sectional view of the grinder of FIG. 1 taken along line 9-9 as shown in FIG. 7.
Figure 10:
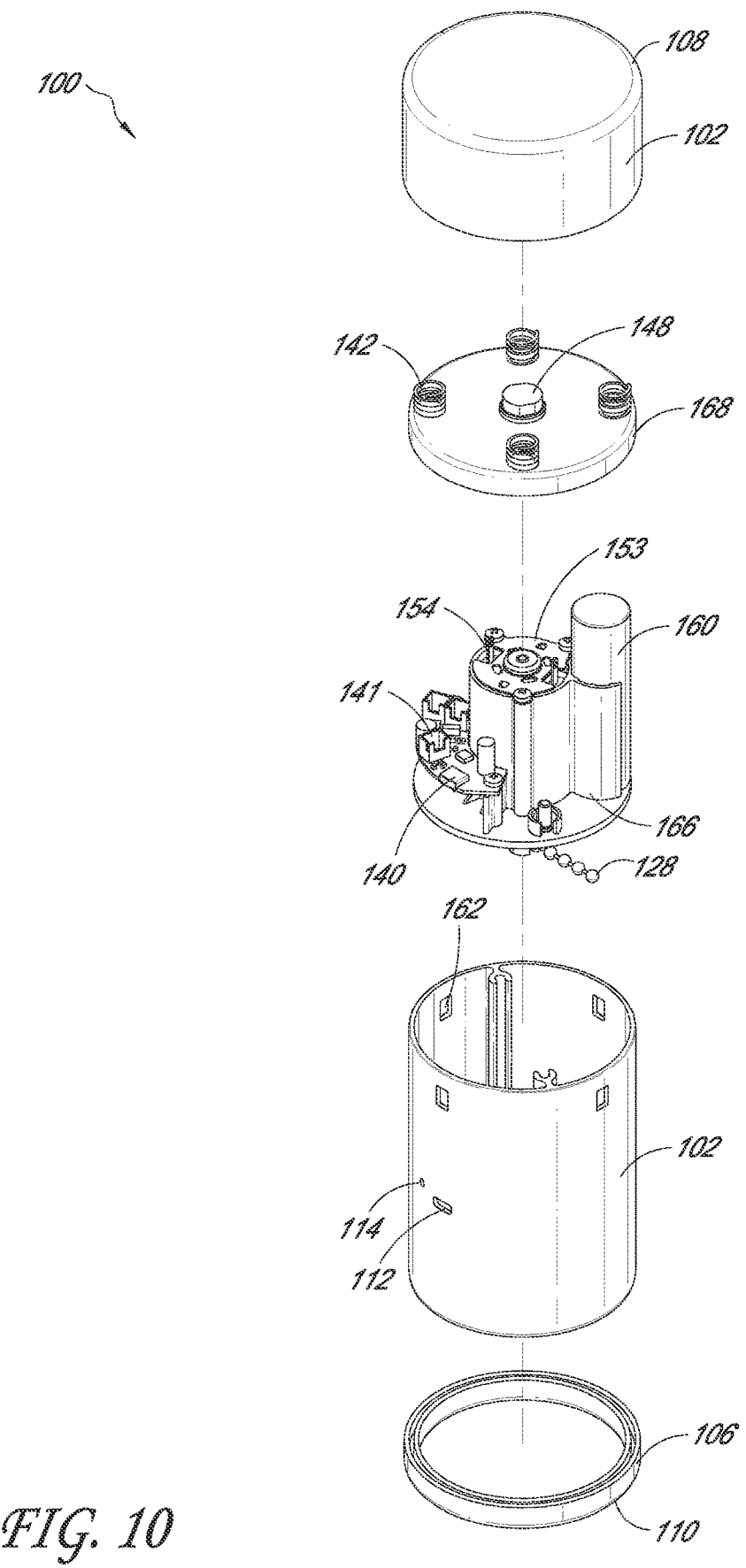
FIG. 10 is an exploded view of the grinder of FIG. 1.

FIG. 2 illustrates a bottom perspective view of the grinder 100. FIG. 3 illustrates a front view of the grinder 100. FIG. 4 illustrates a rear view of the grinder 100. FIG. 5 illustrates a first side view of the grinder 100. FIG. 6 illustrates a second side view of the grinder 100. FIG. 7 illustrates a top view of the grinder 100. FIG. 8 illustrates a bottom view of the grinder 100. FIG. 9 illustrates a cross-sectional view of the grinder 100 taken along line 9-9 as shown in FIG. 7. FIG. 10 illustrates an exploded view of the grinder 100.

As shown in FIG. 2, in certain embodiments, the grinder 100 can include an opening 119. In certain embodiments, the opening 119 can be positioned at the inferior end 110 of the grinder 100. In certain embodiments, the opening 119 can be placed over a material to be ground, cut, chopped, pulverized, or otherwise broken apart.

In certain embodiments, the grinder 100 can include an inner chamber 116. In certain embodiments, the inner chamber 116 can extend superiorly from the opening 119. In certain embodiments, the inner chamber 116 can extend from the opening 119 at least partially towards the superior end 108 of the grinder 100.

In certain embodiments, the inner chamber 116 can be defined by an interior section of the body 104 and/or the rim 106. In certain embodiments, the inner chamber 116 can be at least partially defined by an inner wall 118 of the body 104.

In certain embodiments, the inner chamber 116 can be at least partially defined by a surface 120. In certain embodiments, surface 120 can be part of the body 104. In certain embodiments, as shown in FIG. 9, the surface 120 can be a surface of a frame 166. In certain embodiments, the surface 120 can be an inferior surface of the frame 166. In certain embodiments, the frame 166 can be secured to the body 104 via one or more fasteners 122.

In certain embodiments, the surface 120 can define a superior end of the inner chamber 116. In certain embodiments, the inferior end 110 of the grinder 100 can define an inferior end of the chamber 116. In certain embodiments, the grinder 100 can be dimensioned, shaped, or otherwise configured to receive a material to be ground, cut, chopped, pulverized, or otherwise broken apart.

In certain embodiments, the grinder 100 can include a chain 128. In certain embodiments, the chain 128 can be positioned within the inner chamber 116. In certain embodiments, the chain 128 can be rotated or otherwise moved to grind, cut, chop, pulverize, or otherwise break apart materials positioned within the inner chamber 116. In certain embodiments, the chain 116 can be rotated to grind, cut, chop, pulverize, or otherwise break apart materials that enter the inner chamber 116 as the opening of the body 102 is advanced over the materials.

In certain embodiments, the chain 116 is a ball chain. In certain embodiments, the chain 116 includes a plurality of balls 130. In certain embodiments, the chain 116 can include one ball, two balls, three balls, four balls, five balls, six balls, seven balls, eight balls, nine balls, ten balls, eleven balls, twelve balls, thirteen balls, fourteen balls, fifteen balls, sixteen balls, seventeen balls, eighteen balls, nineteen balls, twenty balls, or any other suitable number of balls 130. In certain embodiments, the chain 116 can include between two balls and twenty balls, between five balls and fifteen balls, between eight balls and twelve balls, between two balls and five balls, between five balls and ten balls, between ten balls and fifteen balls, between fifteen balls and twenty balls, or any other suitable range of balls 130.

In certain embodiments, the balls 130 can be round or generally round, spherical or generally spherical, oblong, cubic or generally cubic, rectangular or generally rectangular, polygonal, faceted, or any other suitable shape. In certain embodiments, a ball 130 can be solid or substantially solid. In certain embodiments, a ball 130 can be hollow or substantially hollow. In certain embodiments, a hollow ball 130 can connect two chains 116, and one or more of those chains 116 can be connected to another hollow ball 130. In certain embodiments, an open ball 130 can be squeezed closed over a wire or string to form one of the balls 130.

In certain embodiments, the balls 130 can have a diameter of between 0.5 mm and 10 mm, between 0.5 mm and 5 mm, between 5 mm and 10 mm, between 1 mm and 9 mm, between 2 mm and 8 mm, between 3 mm and 7 mm, between 4 mm and 6 mm, between 1 mm and 5 mm, between 1 mm and 4 mm, between 1 mm and 3 mm, between 1 mm and 2 mm, between 2 mm and 5 mm, between 2 mm and 3 mm, between 3 mm and 5 mm, between 3 mm and 4 mm, or any other suitable diameter.

In certain embodiments, the balls 130 can be formed of metal, plastic, or any other suitable materials. In certain embodiments, the balls 130 can be formed of steel. In certain embodiments, the balls 130 can be formed of aluminum.

In certain embodiments, adjacent balls 130 can be connected to one another by a link 132. In certain embodiments, adjacent balls 130 can be separated from one another by the link 132. In certain embodiments, a single link 132 can extend through all of the balls 130 of the chain 128. In certain embodiments, a plurality of links 132 can connect the balls 130. In certain embodiments, each adjacent pair of balls 130 can be connected by a different link 132. In certain embodiments, the link or links 132 can be formed of metal. In certain embodiments, the link or links 132 can be formed of steel. In certain embodiments, the link or links 132 can be formed of aluminum. In certain embodiments, the link or links 132 can be formed of plastic.

In certain embodiments, the links 132 of the chain can form spaces between each ball 130. In certain embodiments, the links 132 can allow movement of each ball 130 relative to adjacent balls 130. For example, in certain embodiments, the links 132 can be flexible so that the links 132 bend or flex during rotation or reciprocation of the chain 128. In certain embodiments, each ball 130 can move within the space formed between each ball 130 while the chain 128 rotates or reciprocates to facilitate cutting actions at multiple points and multiple sizes. In certain embodiments, adjacent balls 130 can move in different directions relative to one another during rotation or reciprocation of the chain 128. In certain embodiments, when activated, the chain 128 can cause a whiplash effect or a curling effect as the chain 128 wraps around materials that enter the inner chamber 116 as the opening 119 of the grinder 100 is advanced over the materials.

In certain embodiments, the space between balls 130 can be minimized (e.g., no spacing, enough spacing to permit the chain to flex, or larger spacing). For example, in certain embodiments, the space between adjacent balls 128 can be between 0 mm and 20 mm, between 0.5 mm and 10 mm, between 0.5 mm and 5 mm, between 5 mm and 10 mm, between 1 mm and 9 mm, between 2 mm and 8 mm, between 3 mm and 7 mm, between 4 mm and 6 mm, between 1 mm and 5 mm, between 1 mm and 4 mm, between 1 mm and 3 mm, between 1 mm and 2 mm, between 2 mm and 5 mm, between 2 mm and 3 mm, between 3 mm and 5 mm, between 3 mm and 4 mm, or any other suitable distance. In certain embodiments, the link or links 132 can be rigid or generally rigid (e.g., a rod or wire). In certain embodiments, the link or links 132 can be flexible or generally flexible (e.g., a string of polymeric material).

In certain embodiments, the chain 128 can be a metal ball chain. In certain embodiments, the chain 128 can be a steel ball chain. In certain embodiments, the chain 128 can be an aluminum ball chain. In certain embodiments, the chain 128 can be a polymer ball chain. In certain embodiments, the chain 128 can be a plastic ball chain. In certain embodiments, the chain 128 can be a nylon ball chain.

In certain embodiments, the length of the chain 128 can be between 25 mm and 125 mm, between 50 mm and 100 mm, between 60 mm and 90 mm, between 70 mm and 80 mm, between 60 mm and 70 mm, between 80 mm and 90 mm, between 10 mm and 60 mm, between 20 mm and 50 mm, between 30 mm and 40 mm, or any other suitable length. In certain embodiments, the length of the chain 128 is 10 mm, about 10 mm, 20 mm, about 20 mm, 30 mm, about 30 mm, 40 mm, about 40 mm, 50 mm, about 50 mm, 60 mm, about 60 mm, 70 mm, about 70 mm, 80 mm, about 80 mm, 90 mm, about 90 mm, 100 mm, about 100 mm, 110 mm, about 110 mm, 120 mm, about 120 mm, or any other suitable length.

In certain embodiments, the chain 128 can be coupled to an axle or drive shaft 124. In certain embodiments, the axle 124 can include slot 126. In certain embodiments, a portion of the chain 128 can be secured within the slot 126. As shown in FIG. 8, in certain embodiments, a ball 130a can be secured within the slot 126. In certain embodiments, a portion of the ball 130a can be secured within recesses within the axle 124. As shown in FIG. 8, the ball 130a can be positioned in a middle portion of the chain 128. In certain embodiments, one or more balls 130 are positioned on the chain 128 on both sides of the ball 130a. In certain embodiments, an equal number of balls 130 are positioned along the chain on both sides of the ball 130a. In certain embodiments, the ball 130a can be positioned at one end of the chain 128. In certain embodiments, the ball 130a can be the first ball on one end of the chain 128.

In certain embodiments the axle 124 can rotate within the chamber 116. In certain embodiments, rotation of the axle 124 can cause the chain 128 to undergo circular or rotational motion. In certain embodiments, rotation of the axle 124 can cause the chain 128 to undergo a reciprocal motion.

In certain embodiments, the cap 102 can be manipulated to actuate the grinder 100. In certain embodiments, the cap 102 can be moved relative to the body 104 to actuate the grinder 100. In certain embodiments, the cap 102 can be coupled to a superior end of the body 104. In certain embodiments, the cap 102 can be depressed inferiorly towards the body 104 to actuate the grinder 100. In certain embodiments, actuating the grinder 100 can cause rotation of the axle 124. In certain embodiments, the cap 102 can be released from its depressed position to deactivate the grinder 100. In certain embodiments, the grinder 100 can be deactivated by depressing the cap 102 while the grinder 100 is activated.

As shown in FIG. 9, in certain embodiments, the grinder 100 can include a motor 152. In certain embodiments, the motor 152 can be positioned within an inner cavity 155 of the body 104. In certain embodiments, the motor 152 can be activated to cause rotation of the chain 128.

In certain embodiments, the motor 152 can be coupled to the axle 124. In certain embodiments, the motor can be activated to cause rotation of the axle 124. In certain embodiments, the chain 128 is coupled to the motor 152 via the axle 124. In certain embodiments, the chain 128 is coupled to the motor 152 via one or more gears. In certain embodiments, the motor 152 can be activated to cause the chain 128 to undergo circular or rotational motion. In certain embodiments, the motor 152 can be activated to cause the chain 128 to undergo reciprocal motion.

In certain embodiments, the motor 152 can be actuated by the depression of the cap 102 towards the body 104. In certain embodiments, the motor 152 can be deactivated by release of the cap 102 from its depressed position. In certain embodiments, the motor 152 can be deactivated be depressing the cap 102 while the motor 152 is active.

In certain embodiments, the grinder 100 includes an actuator 146. In certain embodiments, the actuator 146 can be positioned or otherwise configured to be actuated by the cap 102. In certain embodiments, the actuator 146 can be positioned to be actuated by the depression of the cap 102 towards the body 104. In certain embodiments, the actuator 146 configured to actuate the motor 152. In certain embodiments, a protrusion 144 on an interior surface of the cap 102 can be positioned to actuate the actuator 146 upon depression of the cap 102. In certain embodiments, the actuator 146 can be configured to actuate the motor 152 when actuated by the cap 102. In certain embodiments, the actuator 146 can include a button, switch, slider, or other suitable actuation mechanism 148. In certain embodiments, the actuation mechanism 148 can be positioned or otherwise configured to be contacted by cap 102 when the cap 102 is depressed. In certain embodiments, the actuation mechanism 148 can be positioned or otherwise configured to be contacted by the protrusion 144 when the cap 102 is depressed.

In certain embodiments, the grinder 100 can include a power source 160. In certain embodiments, the power source 160 can be a battery. In certain embodiments, the power source 160 can selectively provide power to the motor 152. In certain embodiments, depression of the cap 152 can establish a connection between the power source 160 and the motor 152. In certain embodiments, actuation of the actuation mechanism 148 can establish a connection between the power source 160 and the motor 152.

In certain embodiments, the actuator 146 can include one or more terminals 150. In certain embodiments, the actuator 146 can be electrically connected to the power source 160 and the motor 152 via terminals 150.

In certain embodiments, the motor 152 can include one or more terminals 154. In certain embodiments, the motor 152 can be electrically connected to the actuator 146 and the power source 160 via the terminals 154.

In certain embodiments, the actuation mechanism 148 can be actuated to establish a connection between the power source 160 and the motor 152. For example, in certain embodiments, the actuation mechanism 148 can be actuated to complete a circuit between the power source 160 and the motor 152. In certain embodiments, the actuator 146 can include a switch or microswitch that can complete a circuit between the power source 160 and the motor 152 upon actuation of the actuation mechanism 148.

In certain embodiments, the actuator 146 can include a momentary contact switch. In such embodiments, the motor 152 can be activated only while the actuation mechanism 148 is actuated. In certain embodiments, the actuator 146 can include a normally-off momentary contact switch.

In certain embodiments, the actuator 146 can include a non-momentary contact switch. In such embodiments, the motor 152 can be activated by a first actuation of the actuation mechanism 148 and de-activated by a second actuation of the actuation mechanism 148.

In certain embodiments, the power source 160 can be rechargeable. In certain embodiments, the power source 160 can be a rechargeable battery. In certain embodiments, the power source 160 can be a lithium ion battery. In certain embodiments, the power source 160 can be charged through inductive charging. In certain embodiments, the power source 160 can be charged through connection to a power cable.

In certain embodiments, the grinder 100 can include a port 140 configured to receive a power cable. In certain embodiments, the power source 160 can be charged through the port 140. In certain embodiments, the port 140 can be a USB port, a micro-USB port, or any other suitable port. In certain embodiments, the port 140 is aligned with an opening 112 within the body 104 of the grinder 100. In certain embodiments, the port 140 is accessible through the opening 112.

In certain embodiments, the grinder 100 can include an electronics package 141. In certain embodiments, the electronics package 141 can be a printed circuit board. In certain embodiments, the electronics package 141 can include the port 140. In certain embodiments, the electronics module can be coupled to one or more of the power source 106, the motor 152, and the actuator 146.

In certain embodiments, the body 104 includes an indicator 114. In certain embodiments, the indicator 114 can be configured to indicate a state of the grinder 100. In certain embodiments, the indicator 114 can be configured to indicate a power level of the power source 160. For example, in certain embodiments, the indicator 114 can be configured to indicate if the power source 160 is fully charged, charging, and/or at a low power level. In certain embodiments, the indicator 114 can be a light, such as an LED. In certain embodiments, the indicator 114 can emit light at a first color, such as red, when the power source 160 is charging and at a second color, such as green, when the power source 160 is charged. In certain embodiments, the indicator 114 can emit light when the power source 160 is at a low power level. For example, in certain embodiments, the indicator 114 can emit a red light when the power source 160 is at a low power level. In certain embodiments, the indicator 114 can flash when the power source 160 is at a low power level. In certain embodiments, the indicator 114 can be part of the electronics package 141.

In certain embodiments, the grinder 100 includes one or more springs 142. In certain embodiments, the springs 142 can be positioned between the body 104 and the cap 102 of the grinder 100. In certain embodiments, the springs 142 can be compressed upon depression of the cap 102 towards the body 104. In certain embodiments, if a force depressing the cap 102 is removed from the cap 102, the springs can expand to cause the cap 102 to return to a resting position.

In certain embodiments, the grinder 100 can include an inner cap 168. In certain embodiments, the inner cap 168 can couple to or be integrally formed with a superior edge of the body 104. In certain embodiments, the inner cap 168 can be part of the body 104 and form a superior end thereof.

In certain embodiments, the springs 142 can be positioned between the cap 102 and the inner cap 168. In certain embodiments, the springs 142 can be positioned between an interior surface of the cap 102 and a superior surface of the inner cap 168. In certain embodiments, the springs 142 can be coupled to one or both of the cap 102 and the inner cap 168. In certain embodiments, the springs 142 can be compressed upon depression of the cap 102 towards the inner cap 168. In certain embodiments, if a force depressing the cap 102 is removed from the cap 102, the springs can expand to cause the cap 102 to return to a resting position.

In certain embodiments, the actuator 146 can extend through an opening in the inner cap 168 such that the actuation mechanism 146 is positioned between the cap 102 and the inner cap 168 and the terminals 150 are positioned within the inner cavity 155 of the grinder 100.

In certain embodiments, the body 104 can include a one or more slots 162. In certain embodiments, each slot 162 can receive a protrusion or ramp 164 of the cap 102. In certain embodiments, the protrusions 164 can move vertically within the slots 162. In certain embodiments, the cap 102 can be coupled to the body 104 via the protrusions 164.

In certain embodiments, the frame 166 can be configured to hold or secure one or more components within the inner cavity 155 of the grinder 100. In certain embodiments, the frame 144 can hold or secure one or more of the motor 152, the power source 160, and the electronics package 141.

In certain embodiments, a cover 153 can be positioned over a superior end of the motor 152. In certain embodiments, the cover 153 can be secured to the frame 166. In certain embodiments, the cover 153 can hold or secure the motor 152 within the frame 166. In certain embodiments, the motor 152 can couple to the axle 124 through an opening in the frame 166.

Figure 11:
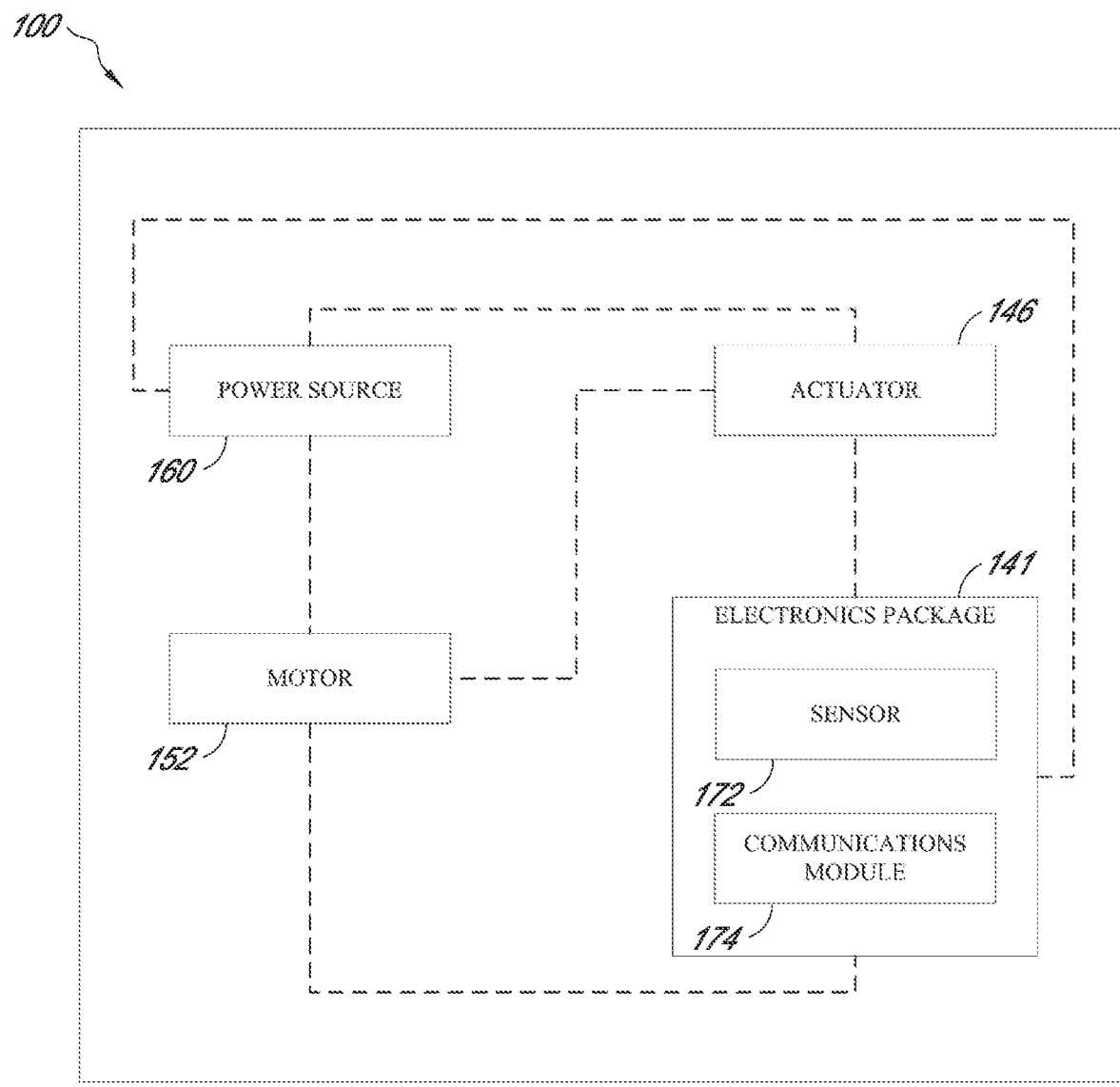
FIG. 11 is a block diagram depicting electrical components of the grinder of FIG. 1.

FIG. 11 illustrates a block diagram depicting electrical components of the grinder 100. As shown in FIG. 11, in certain embodiments, the grinder 100 can include the actuator 146, the motor 152, and the power source 160. In certain embodiments, actuator 146 can be electrically connected to one or both of the motor 152 and the power source 160. In certain embodiments, the motor 152 can be electrically connected to one or both of the actuator 146 and the power source 160. In certain embodiments, the power source 160 can be electrically connected to one or both of the actuator 146 and the power source 160.

As shown in FIG. 11, in certain embodiments, the grinder 100 can include the electronics package 141. In certain embodiments, the electronics package 141 can be electrically connected to one or more of the actuator 146, the motor 152, and the power source 160.

In certain embodiments, the grinder 100 can include one or more sensors 141. In certain embodiments, the one or more sensors 172 may be coupled to or part of the electronics package 141. In certain embodiments, the one or more sensors 172 can be electrically connected to one or more of the actuator 146, the motor 152, and the power source 160. In certain embodiments, the grinder 100 can include one or more sensors 172 configured to detect an orientation of the grinder 100. In certain embodiments, the sensors 172 can include one or more accelerometers, gyroscopes, or any other suitable orientation sensors. In certain embodiments, the grinder 100 can be configured to deactivate the motor 152 if a bottom edge of the grinder 100 is not positioned at a predefined orientation. For example, in certain embodiments, in certain embodiments, the one or more sensors 172 are configured to detect when the grinder is tilted or rotated such that the opening 119 and/or bottom edge of the inferior end 110 are positioned at an angle to the ground or are not parallel with the ground. In certain embodiments, the grinder 100 can be configured to deactivate the motor 152 when the grinder 100 is tilted or rotated such that the opening 119 and/or bottom edge of the inferior end 110 are positioned at an angle to the ground or are not parallel with the ground. In certain embodiments, the one or more sensors 172 are configured to detect if the opening 119 is facing in a downward direction and/or if the grinder 100 is tilted or rotated such that the opening 119 is rotated away from the downward direction. In certain embodiments, the grinder 100 can be configured to deactivate the motor 152 when the grinder 100 is tilted or rotated such that the opening 119 is rotated away from the downward direction. In certain embodiments, deactivating the motor 152 when the grinder 100 is tilted or rotated can prevent injury to a user by preventing or restricting contact with a body part of the user. In certain embodiments, the electronics package 141 can include one or more processors configured to receive information from the one or more sensors 172 and to cause deactivation of the motor 152.

In certain embodiments, the one or more sensors 172 can be positioned on the inferior end 110 of the grinder 100. In certain embodiments, the one or more sensors 172 can be positioned on the rim 106. In certain embodiments, the one or more sensors 172 can be positioned within the chamber 116.

In certain embodiments, the grinder 100 can communicate with one or more external devices via wireless or Bluetooth connectivity. In certain embodiments, the grinder 100 can include a communications module 174. In certain embodiments, the communications module 174 can be part of the electronics package 141. In certain embodiments, the communications module 174 can be electrically connected to one or more of the actuator 146, the motor 152, and the power source 160. In certain embodiments, the communications module 174 can be a transmitter, receiver, transceiver, or any other suitable communications module. In certain embodiments, the communications module 174 can communicate via wireless, Bluetooth, or any other suitable communications standard. In certain embodiments, the communications module 174 can be configured to provide data to an external device. For example, in certain embodiments, the communications module 174 can be configured to transmit information related to the speed of revolution of the motor 152, a power or battery level of the power source 160, an amount of use of the grinder 100, a duration of use of the grinder 100, or any other information pertaining to the use of the grinder 100. In certain embodiments, the communications module 174 can be configured to receive information from an external device. For example, in certain embodiments, the communications module 174 can receive instructions to modify a speed of revolution of the motor 152. In certain embodiments, an application running on an external device can be used to control the grinder 100. In certain embodiments, the electronics package 141 can include one or more processors configured to process instructions received by the communications module 174 and control the operation of the grinder 100. For example, in certain embodiments, one or more processors can modify the speed of revolution of the motor 152 in response to instructions received by the communications module 174.

In certain embodiments, the grinder 100 can be used to grind an input material, such as an herb, spice, *cannabis*, or other plant material into a finer product. In certain embodiments, the grinder 100 can be positioned so that the opening 119 is aligned over the input material.

After the opening 119 is aligned over the input material, in certain embodiments, grinder 100 can be actuated to cause the chain 128 to rotate or reciprocate within the chamber 116. As described herein, in certain embodiments, the grinder 100 can be actuated by depression of the cap 102 toward the body 104.

In certain embodiments, while the chain 128 is rotating or reciprocating within the chamber 116, the grinder 100 can be lowered over the input material so that the input material enters the chamber 116 and the chain 128 contacts the material. In certain embodiments, rotation or reciprocation of the chain 128 can grind, cut, chop, pulverize or otherwise break apart the input material into a finer product. As described herein, in certain embodiments, rotation or reciprocation of the chain 128 can facilitate cutting actions at multiple points and multiple sizes. In certain embodiments, when activated, the chain 128 can cause a whiplash effect or a curling effect as the chain 128 wraps around materials that enter the inner chamber 116 as the opening 119 of the grinder 100 is advanced over the materials.

In certain embodiments, when activated, the chain 128 can grind, cut, pulverize or otherwise break apart a plant material so that the stems of the plant material or separated from the remaining material. For example, in certain embodiments, the cutting actions at multiple points multiple sizes can separate the stems from the remaining material. In certain embodiments, the whiplash effect or curling effect can separate the stems from the remaining material. In certain embodiments, the chain 128 can break the stems apart from the remaining material. In certain embodiments in which the chain 128 breaks the stems apart from the remaining material, the chain 128 can grind, cut, chop, or pulverize the remaining material into a finer product. In certain embodiments, a plastic chain 128 can break the stems apart from the remaining product without cutting the stems. In certain embodiments, a plastic chain 128 can grind, cut, chop, or pulverize the remaining material to a finer product.

In certain embodiments, after the input material is ground, cut, chopped, pulverized, or otherwise broken apart into a finer product, the grinder 100 can be deactivated. In certain embodiments, the grinder 100 is deactivated by releasing the cap 102. In certain embodiments, the grinder 100 is deactivated by depressing the cap 102 while the grinder 100 is active.

In certain embodiments, the grinder 100 can be activated after the grinder 100 is lowered over the input material so that the input material is positioned within the inner chamber 116.

In certain embodiments, the grinder 100 can be lowered over the input material without manually touching the input material. Manual contact with an input material, such as *cannabis* can damage the ground product, for example, due to oils on the skin. In certain embodiments, the grinder 100 can be used to grind an input material into a finer product without manual contact with the input material or product.

In certain embodiments, a receptacle can be positioned beneath the grinder 100 during or after grinding to receive the ground product from the grinder 100. In certain embodiments, the receptacle can be a lid.

In certain embodiments in which the stems are broken apart from a plant material, the stems can be removed from the ground product after grinding the plant material.

Figure 12:
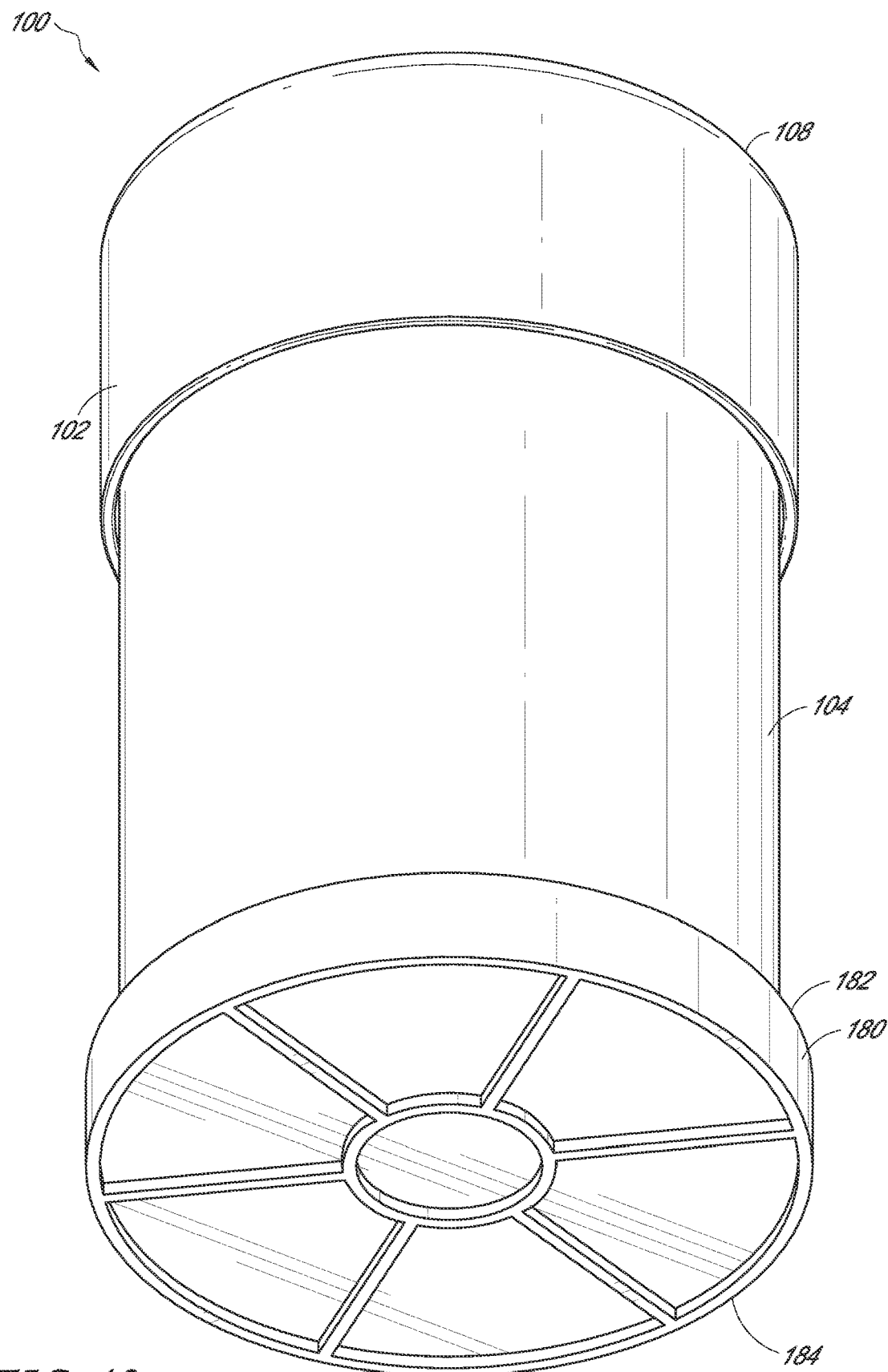
FIG. 12 is perspective view of the grinder of FIG. 1 and a lid.
Figure 13:
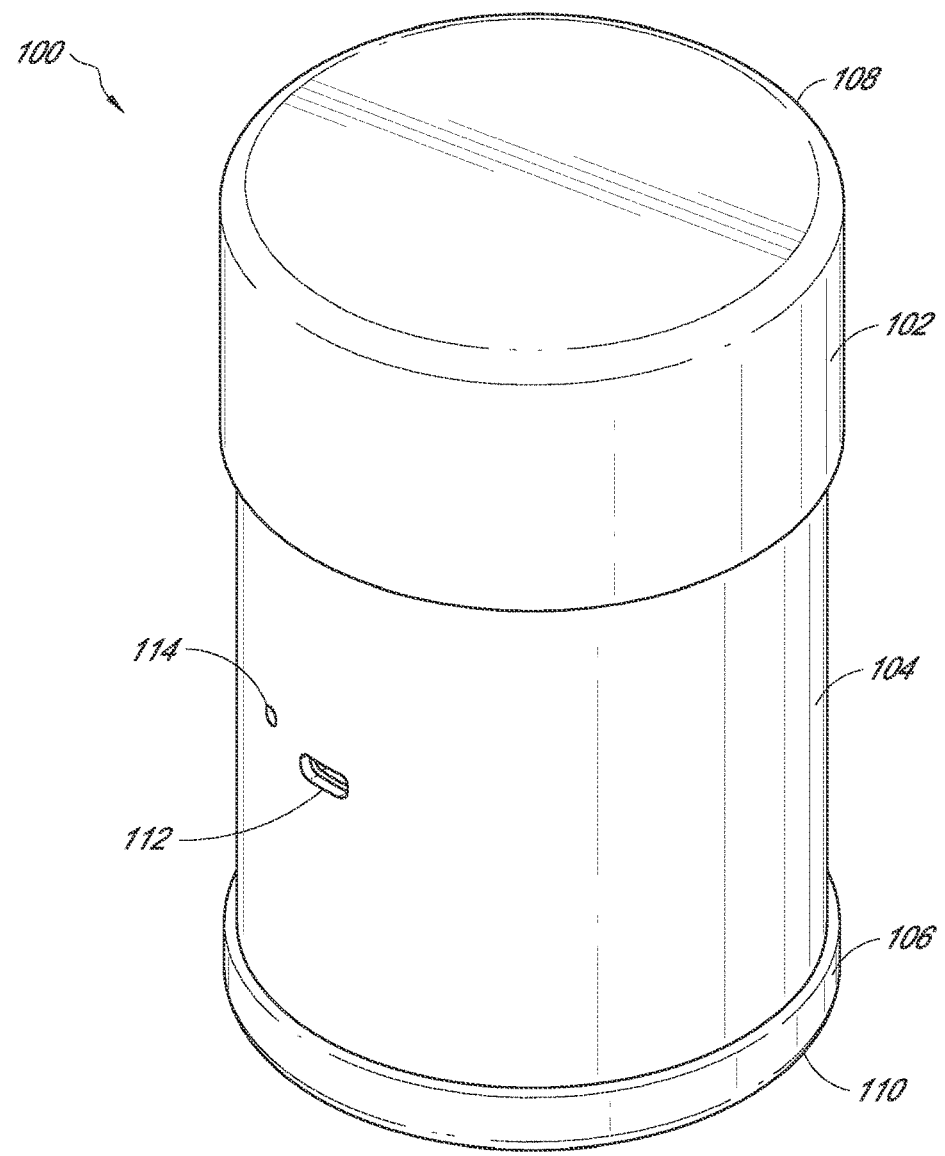
FIG. 13 is an exploded view of the grinder and lid of FIG. 12.
Figure 13:
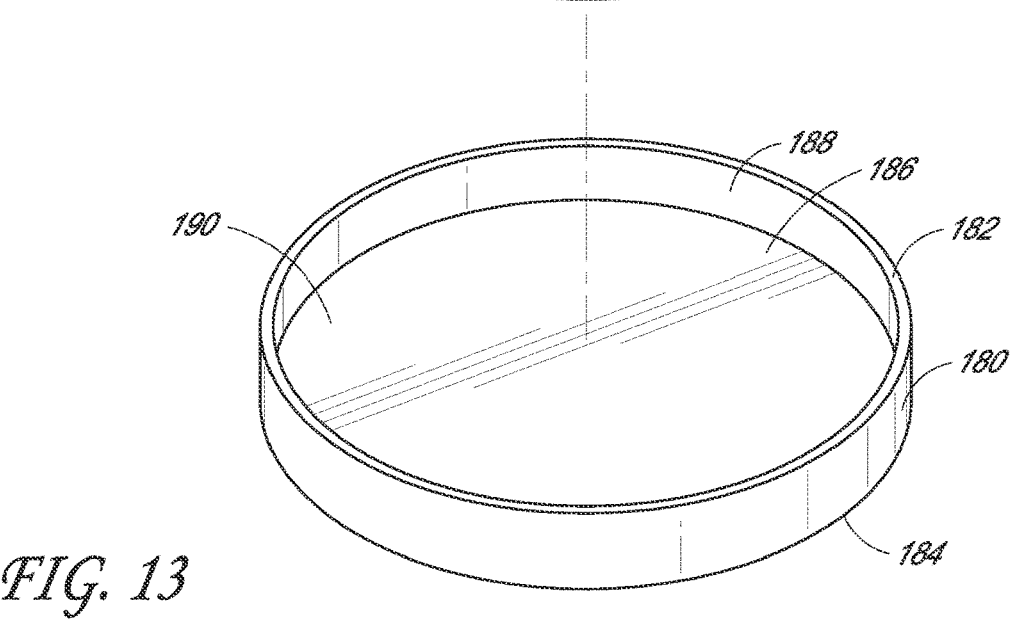

FIG. 12 illustrates a perspective view of the grinder 100 coupled to a lid 180. FIG. 13 illustrates an exploded view depicting the grinder 100 separated from the lid 180. As shown in FIGS. 11 and 12, in certain embodiments, the lid 180 can include a bottom 184 and an upper rim 182. In certain embodiments, the lid 180 can include a sidewall 182 extending between the bottom 184 and the upper rim 182. In certain embodiments, an interior surface 186 can be defined by the bottom 184. In certain embodiments, the interior surface 186 and sidewall 182 can define an inner chamber 190.

As shown in FIG. 12, in certain embodiments, the lid 180 can be removably coupled to the grinder 100. In certain embodiments, the lid 180 can couple to the grinder 100 via a friction fit or interference fit. In certain embodiments, the lid 180 can be coupled to the grinder 100 when the grinder 100 is not in use. In certain embodiments, the lid 180 can couple to the grinder 100 when the grinder 100 is actuated. In certain embodiments, a material to be processed by the grinder 100 can be placed within the inner chamber 190 of the lid 180. In certain embodiments, the grinder 100 can be lowered over the material within the inner chamber 190 to grind the material.

In certain embodiments, the lid 180 can be coupled to the grinder 100 during actuation of the motor 152 to prevent contact between a user and the moving components of the grinder 100. In certain embodiments, the sensors 172 can detect when the lid 180 is coupled to the grinder 100. In certain embodiments, the sensors 172 or a processor receiving data from the sensors 172 can prevent activation of the motor 152 when the lid 180 is not coupled to the grinder 100.

In certain embodiments, the lid 180 can be positioned to receive a ground product from the chamber 116. In certain embodiments, the sidewall 182 can prevent spillage of the ground product from within the lid 180. In certain embodiments, the lid 180 can hold the ground product for delivery of the ground product.

While the above detailed description has shown, described, and pointed out novel features of the development as applied to various embodiments, it will be understood that various omissions, substitutions, and changes in the form and details of the devices illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods of manufacture and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A grinder, comprising:
   a body comprising:
     a first end;
     a second end defining an opening; and
     an interior surface defining an inner chamber extending from the opening at least partially towards the first end;
   a chain positioned within the inner chamber, the chain comprising a plurality of balls and a plurality of links connecting the plurality of balls, wherein the chain has a length between 25 mm to 125 mm; and
   a motor coupled to the chain via an axle, the motor configured to cause rotational or reciprocal motion of the chain within the inner chamber; and
   an actuator comprising an actuation mechanism configured to activate the motor;
   wherein the body is configured to be lowered over a material so that the chain contacts the material.

2. The grinder of claim 1, wherein the actuation mechanism comprises a button, switch or slider.

3. The grinder of claim 1, wherein the chain includes between five balls and ten balls.

4. The grinder of claim 1, wherein the balls have a diameter between 0.5 mm to 5 mm.

5. The grinder of claim 1, wherein the balls are hollow.

6. The grinder of claim 1, wherein the chain is formed of one or more metals.

7. The grinder of claim 1, wherein the chain is steel.

8. The grinder of claim 1, wherein a middle section of the chain is secured to the axle.

9. The grinder of claim 1, wherein the plurality of links form spaces between adjacent balls of the plurality of balls.

10. The grinder of claim 9, wherein adjacent balls of the plurality of balls are separated by a distance between 0.5 mm to 5 mm.

11. The grinder of either claim 1, wherein the plurality of links are rigid.

12. The grinder of either claim 1, wherein the plurality of links are flexible.

13. The grinder of claim 1, further comprising a power source configured to provide electrical power to the motor.

* * * * *